United States Patent

[11] 3,573,765

[72] Inventor Anthony J. Perneski
Martinsville, N.J.

[21] Appl. No. 772,667
[22] Filed Nov. 1, 1968
[45] Patented Apr. 6, 1971
[73] Assignee Bell Telephone Laboratories, Incorporated
Murray Hill, N.J.

[54] DOMAIN PROPAGATION ARRANGEMENT
11 Claims, 13 Drawing Figs.

[52] U.S. Cl. .......... 340/174
[51] Int. Cl. .......... G11c 11/14, G11c 19/00
[50] Field of Search .......... 340/174 (TF), (SR)

[56] References Cited
UNITED STATES PATENTS
3,460,116 8/1969 Bobeck et al. .......... 340/174

*Primary Examiner*—James W. Moffitt
*Attorneys*—R. J. Guenther and Kenneth B. Hamlin

ABSTRACT: A read-only domain propagation memory is realized by appliqueing magnetic traps for single wall domains along a propagation channel for such domains. The traps can be defined by a magnetically soft or by a permanent magnet overlay arrangement which extracts a preset pattern of domains from the propagation channel responsive to a control signal. The overlays are removable to permit a change in the domain pattern.

INVENTOR
A. J. PERNESKI
BY Herbert M. Shapiro
ATTORNEY

DOMAIN PROPAGATION ARRANGEMENT

FIELD OF THE INVENTION

This invention relates to data processing arrangements and, more particularly, to such arrangement employing magnetic media in which single wall domains can be propagated.

BACKGROUND OF THE INVENTION

A single wall domain is a magnetic domain bounded by a domain wall which closes on itself and has a geometry independent of the boundary of the sheet in which it is moved. The domain conveniently assumes the shape of a circle (viz., cylinder) in the plane of the sheet and has a stable diameter determined primarily by the material parameters. A bias field of a polarity to contract domains insures movement of domains as stable entities. The Bell System Technical Journal, Volume XLVI, No. 8, Oct. 1967, at pages 1901 et seq., describes the propagation of single wall domains in a propagation medium such as sheet of a rare earth orthoferrite.

The movement of single wall domains is accomplished normally by generating consecutively offset localized fields (actually field gradients) of a polarity to attract domains. In this manner, a domain follows the consecutive attracting fields from input to output positions in the sheet. A three-phase propagation operation provides the directionality along a selected propagation path in a manner consistent with the teaching of the prior art.

The propagation wiring pattern assumes a geometry dictated by the material in which the domains are moved. A typical material is a rare earth orthoferrite such as lutecium orthoferrite. These materials have preferred directions of magnetization substantially normal to the plane of the sheet. If we adopt the convention that a sheet is saturated magnetically in a negative direction along an axis normal to the plane of the sheet, the magnetization of a single wall domain is saturated in the other or positive direction along that axis. The domain then may be represented as an encircled plus sign where the circle represents the domain wall thereabout. The propagation wiring pattern for generating the localized fields is conveniently in the form of consecutively offset closed loops to correspond to the circular geometry of the domain.

A variety of materials provide domains having diameters far smaller than that which can be utilized by presently obtainable minimum conductor geometry. Consequently, the potential packing density for single wall domain propagation devices cannot be realized readily unless the constraint of discrete propagation loop conductors is obviated. On the other hand, discrete propagation conductors permit domain propagation selection and logic operations difficult to achieve in their absence.

An object of this invention is to provide a read-only domain propagation arrangement wherein selected domains are removed from a stream of domains in the absence of discrete propagation conductors.

My copending application Ser. No. 760,244 filed Sept. 17, 1968, describes a multichannel domain propagation arrangement wherein a channel is selected for domain propagation by permuting the consecutive directions of a magnetic field normally rotated to consecutive orientations in the plane of a sheet in which single wall domains are moved. Such a field is transverse to the preferred direction of magnetization in such a sheet and thus has only negligible direct effect on domains in the sheet. Magnetically soft overlays respond to the transverse field by exhibiting magnetic pole concentrations which attract domains. As the pole patterns change in response to the field in different orientations, the domains in the sheet beneath the overlays follow the attracting pole concentrations.

BRIEF DESCRIPTION OF THE INVENTION

This invention is based on the realization that magnetically soft overlays can be appliqued, removably, to a single wall domain propagation channel to remove domains from certain locations in that channel thus defining a domain pattern representative of information. In one embodiment of this invention, a propagation channel for single wall domains is defined in a sheet of a rare earth orthoferrite by an overlay pattern of bars and T-shapes aligned along an axis between input and output positions. Domain traps are defined illustratively by C-shaped overlays next adjacent locations in which the absence of domains is desired. The channel is filled with domains initially and selected domains then are withdrawn from the channel into associated traps. The remaining domain pattern, representative of binary ones, is advanced to the output position for detection. A change in the applique, of course, changes the domain pattern so advanced. Alternatively, and particularly for microgeometries, the overlays defining the propagation channel as well as those defining the traps are appliqued together in order to avoid alignment problems. A read-only memory useful, for example, for digitized sound recording is realized.

BRIEF DESCRIPTION OF THE DRAWING

FIGS. 3A through 3D and 4A through 4F are illustrations of magnetic conditions in response to magnetic fields generated during operation of the arrangement of FIG. 1.

DETAILED DESCRIPTION

Figure 1:
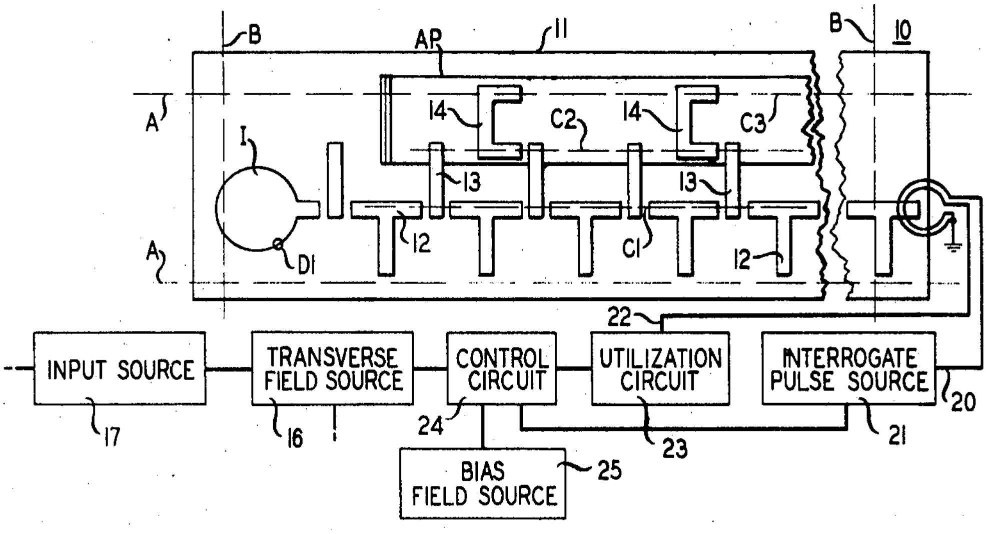
FIG. 1 is a schematic representation of a domain propagation arrangement in accordance with this invention.

FIG. 1 shows an arrangement 10 in accordance with this invention. The arrangement comprises a magnetic sheet 11 in which single wall domains are moved along a representative propagation channel C1 from input to output positions.

The channel C1 is defined by magnetically soft overlay patterns in the illustrative form of T and bar shapes 12 and 13 respectively. The overlays provide magnetic poles which attract single wall domains, responsive to a magnetic field rotated in the plane of sheet 11.

Figure 2:
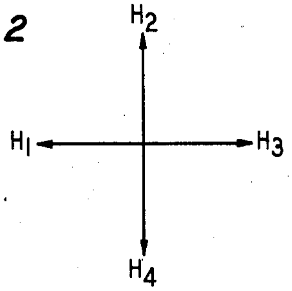
FIG. 2 is an illustration of magnetic fields generated during operation of the arrangement of FIG. 1.

FIG. 2 shows a four-phase sequence of these magnetic fields, H1, H2, H3, and H4, generated at consecutive orientations clockwise as viewed in FIG. 2. During each phase of the sequence, significant magnetic pole strength is developed in the overlay only at the ends of the portions that have long dimensions parallel to the field.

FIGS. 3A, 3B, 3C, and 3D show the sequence of poles that develop along channel C1 as the sequence of fields is generated. A domain D, injected at the left as viewed in FIG. 1, moves to the closest attracting pole, which, for the convention adopted, may be assumed to be positive if the overlays are on the top of sheet 11 and negative if they are on the bottom. In response, the domain moves to the right in a familiar manner as is clear from FIGS. 3A—3D.

The fields are generated conveniently by electrically conducting coils represented by block 16 designated "transverse fields source" in FIG. 1. The coils are omitted to simplify the drawing but are oriented in pairs, orthogonal to sheet 11 along broken lines A and B.

A convenient implementation for introducing domains is shown in FIG. 1. The input implementation comprises a magnetically soft disc 1 about the periphery of which a domain D1 moves as the field sequence H1, H2, H3, and H4 is generated. Domain D1 generates a domain D each complete rotation, as is described in my copending application Ser. No. 756,210 filed Aug. 29, 1969, in response to an increase in the amplitude of field H2. In the absence of such an increase, no domain is generated during that cycle. Thus, the presence and absence of domains can be taken to represent binary 1 and 0 respectively. An input source 17 is connected to transverse field source 16 to this end.

In accordance with this invention, however, a domain is introduced during each complete field rotation insuring an initial operating condition where the entire channel C1 is filled with domains. This condition is illustrated for channel C1 on the bottom line of FIG. 4A. The domains are shown to correspond to the positive poles on the bar-shaped overlays in FIG. 1 when the field H4 is generated.

Also in accordance with this invention, C-chaped overlays 14 are appliqued in positions shown illustratively next adjacent alternative bar-shaped overlays 13 in FIG. 1. The C-shaped overlays and their function may be understood most easily if it is recognized that the C-shaped and bar overlays form part of a second incomplete propagation channel C2 and the C-shaped overlays alone form part of a third incomplete channel C3 as indicated in FIG. 1.

Figure 4A:
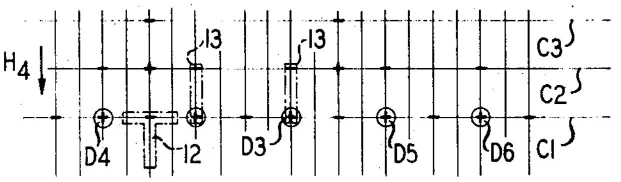
Figure 4B:
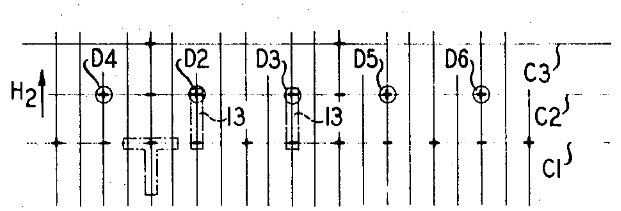

The C-shaped overlays function to withdraw domains from correspondingly situated position in channel C1 in response to an appropriate transverse field sequence permutation. FIG. 4A shows the pole configuration in channels C2 and C3 as well as the pole configuration in channel C1 when the field H4 of FIG. 2 is generated. The next expected field H1 is then omitted and field H2 generated instead causing all domains in channel C1 to move upward into channel C2 as indicated in FIG. 4B.

Figure 4C:
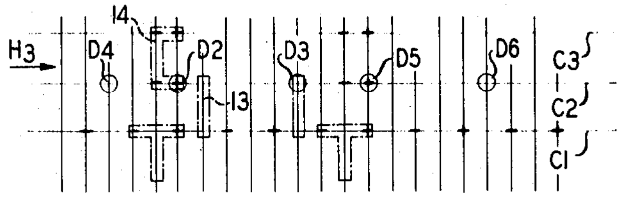
Figure 4D:
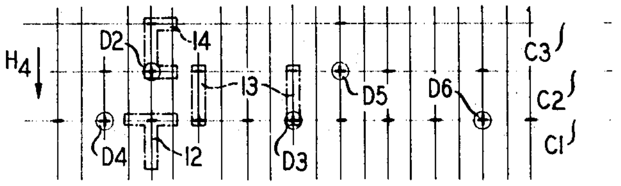
Figure 4E:
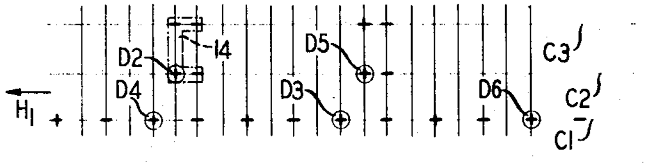
Figure 4F:
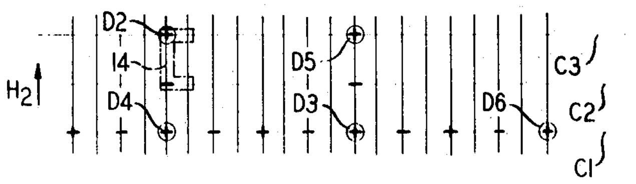

Field H3 is next generated followed by the sequence of FIG. 2 in order. FIGS. 4C through 4F illustrate the resulting pole configurations and corresponding domain dispositions. The FIGS. show, in phantom, overlays 12, 13, and 14 at illustrative positions to demonstrate the relationship between the pole configurations and the overlay pattern. The domain D2 at the bottom of bar 13 in FIG. 4A can be seen to move upward when the field H2 is generated as viewed in FIG. 4B. That domain moves to the left to positive poles on overlay 14 as shown in FIG. 4C when field H3 is generated. When field H4 is next generated as shown in FIG. 4D, the domain moves to the left where it remains when field H1 is next generated as shown in FIG. 4E. When field H2 is generated, domain D2 moves upward to channel C3 as shown in FIG. 4F. Domain D2 is now trapped and unable to move to an output position.

Meanwhile, other domains not located in the vicinity of C-shaped overlays, when the transverse field sequence is permuted, move along channel C1 toward output positions. Consider domain D3 for example. When the H2 field is generated, domain D3 moves upward along bar 13 as shown in FIG. 4B. When the field H3 is next generated, the resulting poles are not positioned to have significant effect on domain D3 and the domain remains stationary. It is convenient to represent the domain as a circle along in the situations where no positive poles are causing movement to a new position.

When field H4 is next generated, the situation is different; domain D3 returns to its position of FIG. 4A in response. This position is shown in FIG. 4D. In response to next consecutive fields H1 and H2, domain D3 advances in conventional fashion towards an output position.

A comparison between FIGS. 4A and 4F indicates that domains D4 and D6 move as does domain D3 and domain D5 is trapped as is domain D2. FIG. 4F shows the untrapped domains moving, in the desired information pattern, along channel C1 towards the output position. It should be clear that information pattern is determined by the positions of the C-shaped overlays when field H1 is omitted from the propagation field sequence and that the resulting pattern is changed merely by appliqueing a different C-shaped overlay configuration to the propagation channel as described. Thus, a read-only memory is provided. A data rate of 240,000 bits per second is sufficient for achieving digitalized audio recording in accordance with well understood considerations.

That data is read out by moving the domain pattern into an output position shown to the extreme right as viewed in FIG. 1. An interrogate conductor 20 couples the output position. Conductor 20 is connected between an interrogate pulse source 21 and ground and functions to collapse domains in the output position when pulsed. An output conductor 22 also couples the output position. Conductor 22 is connected between a utilization circuit 23 and ground. If a domain occupies the output position when a pulse is applied to conductor 20, a signal appears in conductor 22 for detection by utilization circuit 23. The interrogate pulse is usually applied during an H3 phase of a propagation cycle and sources 16 and 21 and circuit 23 are connected to a control circuit 24 for synchronization and activation.

When all information is read out, a collapse field is provided to eliminate all trapped domains. Such a field is provided conveniently by a coil (not shown) encompassing the C-shaped overlays on sheet 11 and lying in the plane of the sheet. The field generating means is represented by a block 25 labeled "-bias field source." The bias field source is connected to control circuit 24 for activation and synchronization and also may function normally to provide a background bias level for maintaining domain size constant if necessary by driving additional coil means (not shown) in accordance with well understood considerations. The collapse field may be followed by a succession of field sequences as shown in FIG. 2 for returning the arrangement of FIG. 1 to its initial condition. The initializing operation can be carried out at a megacycle rate and thus need take only negligible time. This operation may be carried out alternatively when a new applique is positioned and the arrangement first activated.

The various sources and circuits may be any such elements capable of operating in accordance with this invention.

Figure 5:
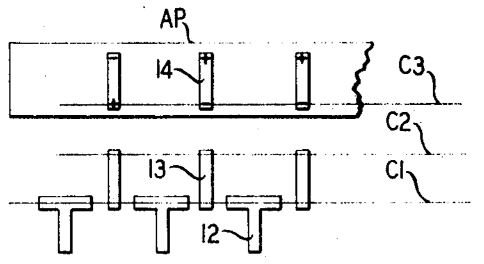
FIG. 5 is a schematic representation of a portion of an alternative arrangement in accordance with this invention.

An alternative arrangement for achieving a similar read-only operation substitutes permanent magnets for the C-shaped overlays in the applique. The overlay for such an arrangement is illustrated in FIG. 5. The bar and T-shaped overlays can be seen to be the same as in FIG. 1. The overlays 14 on the applique are bar-shaped and of a high coercive force material essentially unaffected by the fields generated during operation. Operation of the arrangement of FIG. 5 is essentially as described for the arrangement of FIG. 1, the permanent pole configuration as shown in the FIG. resulting in the trapping of a domain only in the leftmost position as viewed.

A recitation of the various dimensions for the embodiment of FIG. 1 provides an appreciation for the utility of an arrangement in accordance with this invention. For a sheet of SmTb orthoferrite, T and bar-shaped permalloy overlays 5 by 1 mils on a side as shown in FIG. 1 and 5,000 A thick on 8 mil centers move domains of 1.2 mils diameter in response to transverse fields of 10 oersteds. A bias field of 60 oersteds maintains the domain diameter constant during operation and a bias field of 66 oersteds collapses remaining domains after a read operation. The C-shaped overlays are 5 mils on a side for such an arrangement, conveniently evaporated onto a ceramic or glass substrate, AP of FIG. 1, and held by brackets as indicated to insure proper alignment with the propagation channel.

With domains of the order of 0.1 mils, 2.4 million bits can be defined on about 1 square inch of material. This is approximately 10 seconds of digitized high-fidelity sound recording. In other words, 180 square inches provide one-half hour of high fidelity recordings. Fewer square inches are required, of course, as domain size is reduced. With such dimensions, all overlays including the bar and T-shapes may be provided on a glass substrate together in order to avoid alignment problems. Sheet 11 of FIG. 1 in this instance would include only one (or more) input(s) and an output implementation which would define the propagation channel.

What has been described is considered only illustrative of the principles of this invention. Consequently, various embodiments can be devised by those skilled in the art in accordance with those principles yet within the spirit and scope of this invention.

I claim:

1. A domain propagation arrangement comprising a sheet of material in which magnetic domains can be moved, first means for defining for domains in said sheet a propagation channel including a plurality of positions, input means for introducing domains into said plurality of positions, second means for moving domains in said channel, removable means responsive to a first signal for removing from said sequence of positions a first pattern of domains, said last-mentioned means including a plurality of elements organized in said first pattern and removably coupled to said channel, and output means for detecting the presence and absence of domains in said channel.

2. An arrangement in accordance with claim 1 wherein said first means comprises a first magnetically soft overlay pattern responsive to transverse magnetic fields for generating magnetic pole patterns which attract domains.

3. An arrangement in accordance with claim 2 wherein said second means comprises means for generating said transverse fields in a first sequence of orientations in the plane of said sheet thus causing changes in said magnetic pole patterns.

4. An arrangement in accordance with claim 3 wherein said removable means comprises a second magnetically soft overlay arranged in said first pattern and adapted for association with said plurality of positions.

5. An arrangement in accordance with claim 4 wherein said second magnetically soft overlay is positioned in a manner to generate pole patterns which attract domains from a first pattern of positions responsive to a change in said first sequence of orientations for said transverse fields.

6. An arrangement in accordance with claim 3 wherein said removable means comprises an overlay of relatively high coercive force magnetic material arranged in said first pattern and adapted to associate with a like pattern of said plurality of positions.

7. An arrangement in accordance with claim 4 wherein said first magnetically soft overlay comprises a repetitive pattern of bar and T-sahpes and said second overlay comprises magnetically soft C-shapes arranged to correspond to preset ones of said bars in said first pattern.

8. A read-only domain propagation arrangement in accordance with claim 1 wherein said first means also is removably coupled to said channel.

9. A read-only domain propagation arrangement in accordance with claim 8 wherein said first means comprises a soft overlay pattern responsive to transverse magnetic fields in consecutive orientations for generating magnetic pole patterns which attract domains.

10. A read-only domain propagation arrangement in accordance with claim 9 wherein said removable means and said first means comprise first and second overlay patterns on a suitable substrate for mating with said input and output means thereon.

11. A read-only domain propagation arrangement comprising a sheet of material in which single wall domains can be propagated, means for generating a magnetic field rotating to consecutive orientations in the plane of said sheet, means for providing changing repetitive magnetic pole patterns in response to said rotating fields for propagating said domains in a channel in said sheet, means for permuting said orientations, input means for filling said channel with single wall domains, means for removing from said channel selected ones of said domains responsive to a permutation in said orientations and output means detecting the presence and absence of domains in said channel.